United States Patent [19]
Tsimerman

[11] Patent Number: 5,349,829
[45] Date of Patent: Sep. 27, 1994

[54] METHOD AND APPARATUS FOR EVAPORATIVELY COOLING GASES AND/OR FLUIDS

[75] Inventor: Alexandre Tsimerman, Odessa, U.S.S.R.

[73] Assignee: AOC, Inc., Scottsdale, Ariz.

[21] Appl. No.: 886,405

[22] Filed: May 21, 1992

[51] Int. Cl.⁵ .............................................. F28D 5/00
[52] U.S. Cl. .................................. 62/314; 62/304; 62/315; 165/164; 261/106; 261/153
[58] Field of Search ........................ 62/304, 315, 314; 261/151, 153, 96, 98, 105, 106, 109, 111, DIG. 11; 165/164

[56] References Cited

U.S. PATENT DOCUMENTS

| | | | |
|---|---|---|---|
| 3,895,675 | 7/1975 | Rein et al. | 165/164 |
| 4,259,268 | 3/1981 | DiRoss | 261/153 |
| 4,976,113 | 12/1990 | Gershuni et al. | 62/314 |

Primary Examiner—John M. Sollecito
Attorney, Agent, or Firm—Gregory J. Nelson

[57] ABSTRACT

An air cooling method and apparatus in which air to be cooled is directed through the dry channel to sensibly cool the air. Wet channels are arranged adjacent the dry channels and a portion of the air exiting the dry channels is provided as cooled supply air and a portion is redirected through the wet channels countercurrently to the flow in the dry channels. Heat exchange elements extend between the wet and dry channels. A portion of the dry channels includes an adiabatic cooling zone.

11 Claims, 7 Drawing Sheets

| 1454 | 1456 | 1458 |
|---|---|---|
| 1ST SENSIBLE COOLING STAGE | 2ND SENSIBLE COOLING STAGE | ADIABATIC COOLING STAGE |

METHOD AND APPARATUS FOR EVAPORATIVELY COOLING GASES AND/OR FLUIDS

BACKGROUND OF THE INVENTION

1. Field of The Invention

This invention relates to gas cooling apparatus and, more particularly, to evaporative air cooling apparatus using direct and/or indirect cooling methods for multiple cooling purposes.

2. Description Of The Prior Art

U.S. Pat. No. 2,083,436 (De Bothezat) discloses an evaporative air cooler used to cool another air flow. The apparatus uses a radiator with tubes through which air flows, and the walls of which receive water for cooling the flow of air through the tubes.

U.S. Pat. No. 2,162,158 (Coey) discloses several embodiments for cooling air. Included in the embodiments is a heat exchanger in which fresh air is drawn in and is cooled by water flowing through a coil. Air from the cooled chamber is then directed toward a cooling system in which water is evaporated. Air flowing through the evaporative system is cooled and is then supplied to the input side of the cooling heat exchanger.

U.S. Pat. No. 2,214,880 (Crawford) discloses another system in which cooling and dehumidifying in air flows take place. An evaporative cooling system is used to help cool water flowing through cooling coils, and the cold water is then in turn used to cool water in a cooling tower.

U.S. Pat. No. 3,350,892 (Kelley) discloses a two-stage air cooling system in which air is supplied to a chamber which has its own system for cooling air. Water from nozzles is cooled as air passing through a chamber evaporates the water to cool the air. The water is condensed and its temperature is lowered, and the chilled water then passes through a heat exchanger for cooling incoming air. The cooled air then passes through a coil, and the coil is cooled by water and spray chamber which further cools the air flowing through the coil.

U.S. Pat. No. 4,380,910 (Hood et al) discloses a multi-stage cooling system in which one stream of air is passed through a water saturated evaporative cooling medium where the water is cooled as well as the air that passes through it. The cooled air passes through a heat exchanger and out of the system. There is a second air stream in the air passing through the heat exchanger and that air is cooled by the first air stream. The second air stream then passes through a water cooled exchange element that is cooled by water from a saturated cooling pad. The second air continues through cooling coils for further cooling. Several stages of direct and indirect cooling are employed, and recirculating water is used in each of the stages.

U.S. Pat. No. 4,429,735 (Nomaguchi et al) discloses a air cooling system in which air flows from a room through a vent and water droplets from a tank are picked up in the air flow. The water evaporates in a heat exchanger and cools outside air that passes through the heat exchanger.

U.S. Pat. No. 4,926,656 (Hickley et al) discloses a cooling system in which air is moved by a fan through a coil and chilled water flows through the coil. The water is chilled when the air passes through a wet evaporative medium, and the air is further cooled in the evaporative medium also. The cooled air then passes from the apparatus to the structure through a delivery conduit.

It will be noted that all of the above discussed patents utilize some type of multiple air flow and direct and indirect cooling of the multiple air flows. In virtually all cases, the apparatus are relatively complicated, cumbersome and typically require multiple fans and multiple pumps, nozzles, and the like. The apparatus of the present invention utilizes indirect as well as direct cooling and multiple air flows, but only a single fan or blower is required. Heat exchanger elements are used in conjunction with evaporative media, and there are two types of air flows, one air flow through a dry channel and one air flow through a wet channel. In one embodiment, a second fan is used for a cooling tower. Although the cooled fluid will be referred to as "air" throughout, it is intended that the term include various two-atom gases as the invention is applicable to these fluids as well.

SUMMARY OF THE INVENTION

The invention described and claimed herein comprises an evaporative air cooling apparatus in which air flows through wet channels and through adjacent dry channels. Initial cooling of the air flow through the dry channels is accomplished by the evaporatively cooled air in the wet channels, and the air flowing through the dry channels is then cooled adiabatically as it flows through an evaporative medium.

Accordingly, a principal object of the present invention is to provide a heat exchanger apparatus having adjacent wet and dry channels through which air flows with heat transfer elements arranged to enhance the transfer of heat from air in the dry channels to air flow in the wet channels.

Another object is to provide new and useful apparatus for evaporatively cooling air and for producing chilled water.

Still another object is to provide a new and useful evaporative air cooling apparatus having multiple flows of air.

Another important object of the invention is to provide a new and useful apparatus for cooling, utilizing air flowing through adjacent channels of alternating wet and dry flows of air.

Another object is to provide a new and useful apparatus for evaporatively cooled air utilizing multiple stages of cooling by air flowing through wet channels and dry channels.

DESCRIPTION OF THE PREFERRED EMBODIMENT

Figure 1:
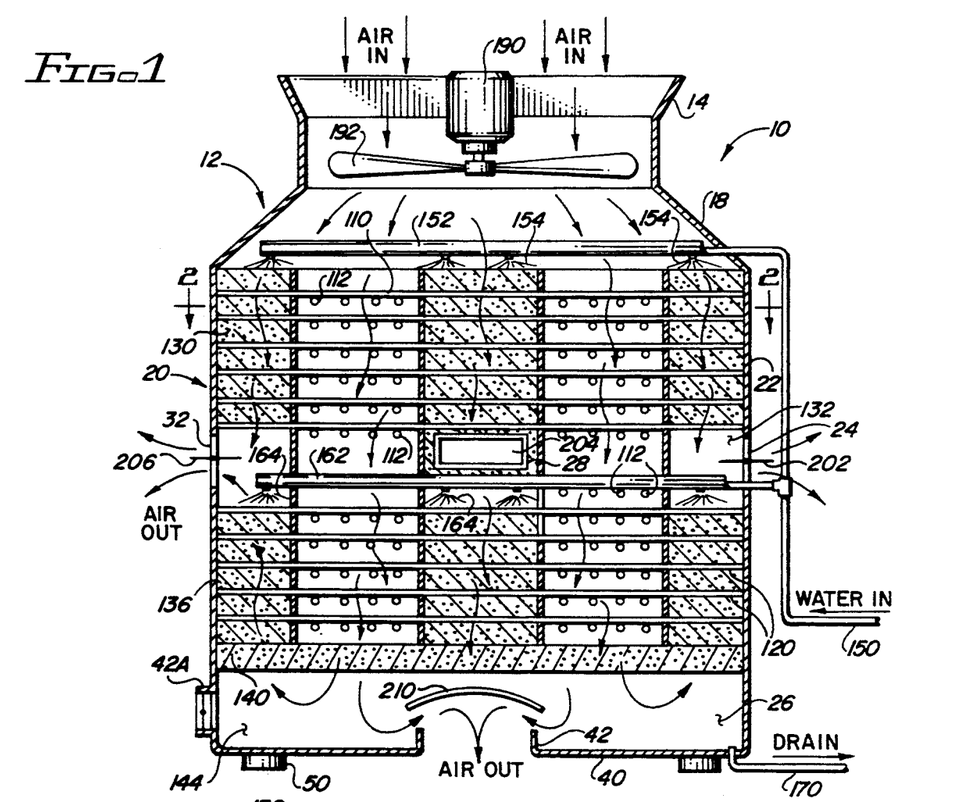
FIG. 1 is a side view in partial section of apparatus embodying the present invention.
Figure 2:
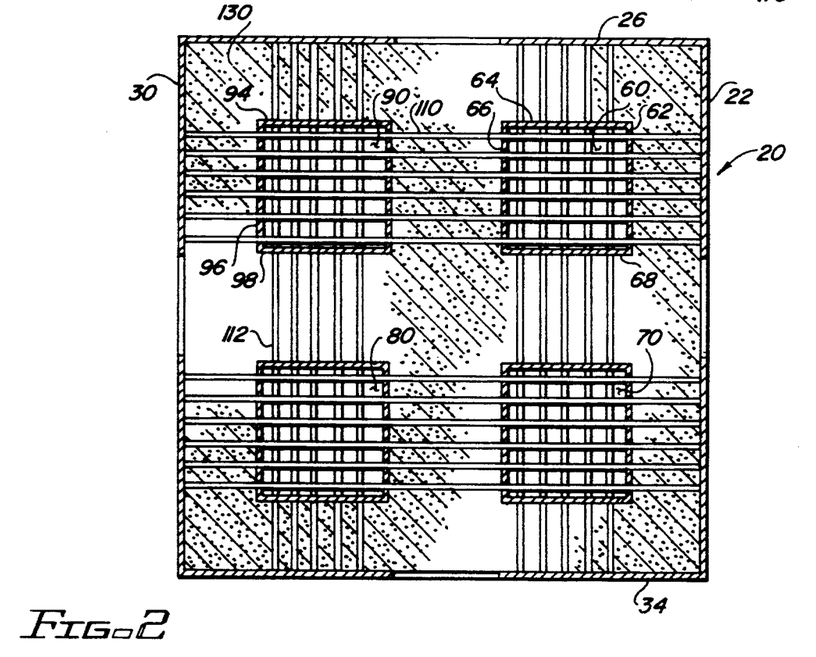
FIG. 2 is a view in partial section taken generally along 2—2 of FIG. 1.

Cooling apparatus 10 of the present invention is illustrated in FIG. 1. The apparatus 10 is a cooling apparatus which utilizes evaporative cooling techniques as well as heat transfer between dry and wet channels in which secondary air is passed through wet evaporative media. Heat exchange elements extend between the wet channels in which the evaporative media is located and dry air channels in which is devoid of evaporative media. FIG. 2 is a sectional view of the apparatus 10 taken generally along line 2—2 of FIG. 1. In the immediately following discussion, reference will be made to FIGS. 1 and 2.

The cooling apparatus 10 includes an upper air intake section 12 enclosing fan 192 driven by motor 190. Intake section 12 diverges at section 18 to lower housing portion 20. The housing 20 may be generally square in cross section as shown in FIG. 2 or may be any other convenient shape.

Fan 192 draws air into the air intake section at open end 14 and directs the air to and through the lower housing portion 20. The air introduced into the unit at the intake is referred to as the total air supply and may be ambient air existing at a wide range of conditions.

The lower housing portion 20 includes opposite side walls 22, 30, rear wall 26, and front wall 34. The terms "rear" and "front" and "side" are for reference and refer to the general orientation of the walls as illustrated in FIG. 2.

Extending through the walls are apertures, three of which are illustrated in FIG. 1. These include aperture 24 in the side wall 22, aperture 28 in the rear wall 26 and aperture 32 in the side wall 30. The flow of air through the apertures is controlled by damper 202, damper 204 and damper 206, respectively. The remaining aperture (not shown) is provided with a similar damper in it to control the outward flow of air outwardly through it.

Housing 20 also includes a bottom 40 which extends between the walls 22, 26, 30 and 34 and which is supported on pads 50. Centrally located in the bottom 40 is an air discharge register 42 for cooled supply air. The bottom area of the housing 20 about the register 42 defines a plenum 144 having a sump in the bottom for receiving excess water, as will be discussed below. A restrictor plate 210 is disposed above the register 42.

Extending vertically through the housing 20 are a plurality of dry channels with four being shown. The term "dry channels" applies to a flow passageway in which the main air flow is sensibly cooled. The dry channels may be any shape and are shown as being square in cross section. They include dry channels 60, 70, 80 and 90. Dry channel 60 is defined by four vertically extending walls 62, 64, 66 and 68. The remaining dry channels are similarly constructed with, for example, channel 90 having walls 92, 94, 96 and 98.

The upper end of each dry channel is located in the upper portion of the housing 20 at about the elevation of the upper end of the housing side walls. The bottom ends of the dry channels 60, 70, 80 and 90 terminate at a location above the bottom 40 of the housing, as shown in FIG. 1.

Evaporative media 130 is disposed around each of the dry channels 60, 70, 80 and 90. A chamber 132 is located at an intermediate elevation adjacent the damper controlled apertures 24, 28 and 32 and essentially divides the housing 20 into two cooling sections, an upper cooling portion and a lower cooling section. The dry channels are continuous and depend to an elevation below the intermediate chamber 132.

Heat transfer elements, shown as rods 110, 112, are arranged in a plurality of spaced-apart grids extend through the upper and lower cooling sections of the dry channels and through the surrounding evaporative media 130. Rods 110 extend generally horizontally between walls 22 and 30 and rods 112 extend generally horizontally between the walls 26 and 34. The rods 110 and 112 are fabricated from a material having high thermal conductivity such as aluminum alloy, copper or similar material.

Beneath chamber 132, evaporative media 136 fills the area around the dry channels extending to the housing walls. The evaporative media extends to about the elevation of the bottom end of the dry channels.

A layer of evaporative media 140 extends horizontally across the bottom of evaporative media 136, dry channels 60, 70, 80 and 90 and across the cross-sectional area of the lower part of housing 20.

A second plurality of heat transfer elements, again in the form of parallel grids of rods extending between the walls of the housing 20, are provided in the lower cooling section of the housing beneath chamber 132. Rods 120 extend generally between walls 22 and 30 and rods 122 extend between the walls 26 and 34 arranged in a grid. The upper rod grids, which include the rods 110 and 112, and the lower rod grids, which includes the rods 120 and 122, both extend in a vertically stacked arrangement or orientation, through the dry channels and the adjacent evaporative media as is best shown in FIG. 1.

A water supply line 150 extends from a water source to an upper water distribution manifold 152 which is disposed above the upper surface of the evaporative media 130 located in the upper cooling section of the housing 20. Water from the manifold 152 is discharged downwardly through a plurality of spray nozzles 154 onto the top surface of evaporative media 130 and from there will downwardly penetrate the media. The nozzles are arranged so water is not directed into the dry channels 60, 70, 80 and 90. Water distribution manifold 162 and nozzles 164 located in intermediate chamber 132 deliver water to the evaporative media in the lower section of housing 20.

The evaporative media 130 disposed around the dry channel evaporates water into the air flowing through the media. The water saturates the evaporative media 130 and, due to the well-known evaporative effect, cooling takes place in evaporative media 130 and 136 of the wet channel which also serves to cool the upper and lower heat transfer grids.

As shown by the arrows in FIG. 1, total inlet air introduced through the upper intake section 12 flows through the dry channels (main air flow) and also through the upper evaporative media 130 (auxiliary air flow). The upper rod grid (rods 110 and 112) is cooled due to evaporation of the water into the air flowing through wetted media 130. Heat transfer along the grid (rods 110, 112) extracts heat from the air flowing through the upper portions of the dry channels 60, 70, 80 and 90.

When the moist air flowing downwardly through the upper evaporative media 130 reaches the intermediate chamber 132, the air is directed outwardly through the damper-controlled apertures, such as aperture 24.

Air flowing downwardly through the dry channels 60, 70, 80 and 90 is further subjected to dry cooling as heat is extracted by the lower grid of heat transfer elements, rods 120, 122. The dry air exits the dry channels and flows through the evaporative media 140 which causes direct evaporative or adiabatic air cooling. The air then enters the lower air plenum 144 where the air flow is divided into two portions. A portion of the air flows outwardly through the register 42 or alternate register 42A as supply air. Register 42 or 42A is connected to a supply duct system for supplying the cooled supply air to an area to be cooled. As indicated by the arrows, another portion of the air reverses direction and flows upwardly through evaporative media 140 and through the lower evaporative media 136 in a secondary air flow. The secondary air flowing upwardly through the evaporative media 136 adjacent the lower portions of the dry channels flows into the intermediate chamber 132 and is discharged outwardly through the damper-controlled apertures joining with the air flow downwardly through the evaporative media 130 from the upper section of the housing.

The bottom of the housing serves as a sump for water which drains through the evaporative media layer 140. A drain line 170 is shown in FIG. 1 for removing the water from the lower housing or for recirculation to the water distribution system, as desired.

In operation, the apparatus 10 has three separate cooling stages. The first cooling stage comprises the evaporative media 130 and the upper rod grid which includes the rods 110 and 112 in the upper portions of the dry channels 60, 70, 80 and 90. The second cooling stage occurs in the lower portion of the apparatus within evaporative media 136 and the grids comprising rods 120, 122. The third stage of cooling occurs in the lower evaporative media 140. Cooling in stages one and two is sensible while cooling in stage three is adiabatic.

The dry channels 60, 70, 80 and 90 are fabricated from any suitable material which is non-corrosive having high thermal conductivity. The evaporative media 130, 136 and 140 may be any appropriate and well-known evaporative material having hygroscopic characteristics, such as aspen shavings, Celdek or the like.

As will be apparent, the apparatus 10 may be appropriately sized, as necessary, for the particular system or application. While four dry channels are illustrated, the apparatus may have as many as necessary or optimum for a specific application.

Figure 3:
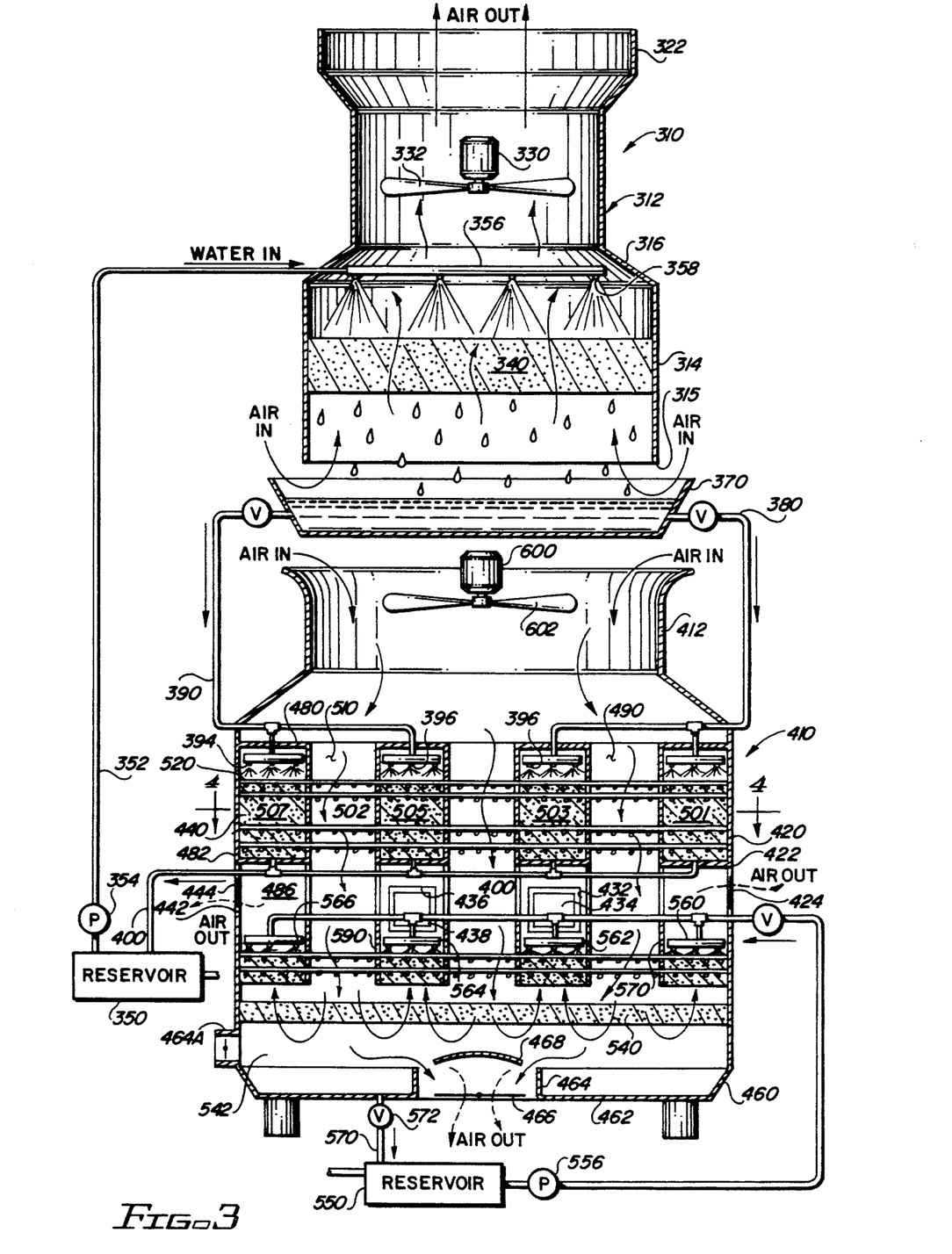
FIG. 3 is a side view in partial section of an alternate embodiment of the apparatus of the present invention.
Figure 4:
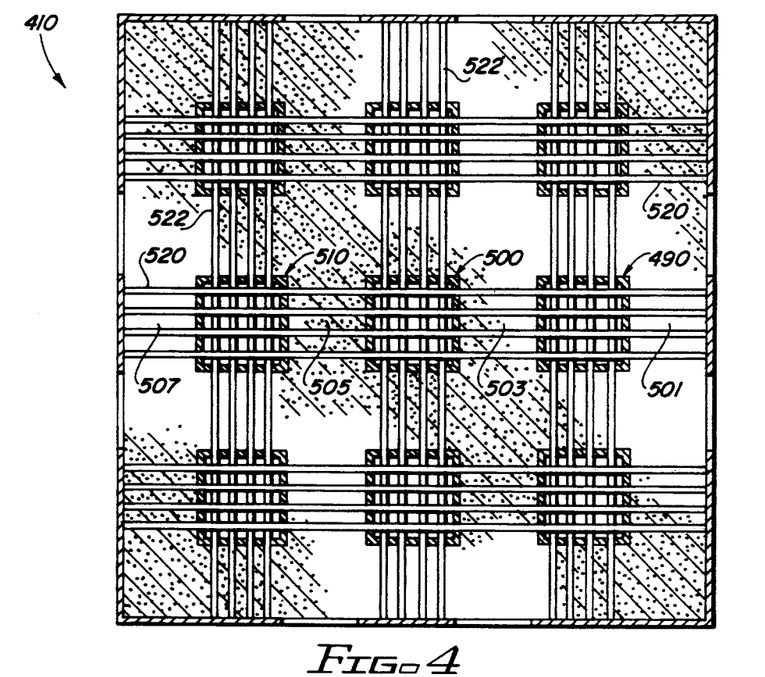
FIG. 4 is a view in partial section taken generally along line 4—4 of FIG. 3.

FIG. 3 is a view in partial section of an alternate embodiment 310 of the apparatus of the present invention. The apparatus 310 has two principal components, a cooling tower 310 and air cooler 410. These may be located in any convenient position relative to one another, as for example with the cooling tower remotely positioned with respect to the air cooler. FIG. 4 is a view in partial section of the cooler 410 taken generally along line 4—4 of FIG. 3.

The cooling tower 310 has an air intake 315 in bottom section 314, an intermediate fan housing section 312 and discharge housing section 322. A fan, having a motor 330 and blades 332, is mounted in the intermediate section 312 and induces a flow of air through the unit as indicated by the arrows.

A layer of evaporative cooling media 340 extends across the bottom section 314. Disposed above the evaporative cooling media 340 is water distribution manifold 356 having a plurality of nozzles 358 which direct a spray of water onto the evaporative media 340. A water supply line 352 connects the water supply reservoir 350 and the manifold 356. Pump 354 supplies the appropriate water flow to the manifold.

The intake air flows inwardly to section 314 and upwardly through the evaporative cooling media 340, cooling the water in a manner well known in the air conditioning field.

The cooled water falls downwardly into water collection pan 370. The water flowing into the pan 370 is substantially cooler than the water flowing into the manifold 356 and outwardly through the nozzles 358 because the outdoor air has absorbed heat through evaporation. The cooled water from pan 370 is directed to cooler 410 as will be discussed below.

The cooler 410 includes upper air intake section 412 and lower housing section 418. The lower section 420 is provided with a plurality of openings 422, 432, 436 and 442 through which the flow of air is controlled by dampers 424, 434, 438 and 444, respectively.

At the bottom of the housing 420, wall 460 extends to bottom plate 462. An air-out or air supply register 464 extends upwardly through the bottom plate 462. Register 464 is appropriately connected to an air duct to deliver supply air to a space to be cooled. Damper 466 is disposed in the air register 464 for controlling the flow of air and a deflector plate 468 is located above the register.

Plate 480 extends substantially horizontally across the upper portion of the lower housing 420. Spaced apart from and generally parallel to the upper plate 480 is an intermediate plate 482 which is located at an elevation corresponding to the upper portion of the openings which extend through the housing.

A plurality of dry channels as represented by channels 490, 500 and 510 are vertically disposed within the lower housing 420. The dry channels extend through the top plate 480 and downwardly to the top of transversely extending evaporative media pad 540. A plurality of aligned apertures in plates 480 and 482 define the opposite open ends of the dry channels. The dry channels are substantially similar with respect to their construction or configuration as the dry channels 60, 70, 80 and 90 of the apparatus 10 described with reference to FIGS. 1 and 2. The dry channels are fabricated of a non-corrosive material having high thermal conductivity. In FIG. 4 nine dry channels are arranged to extend in the lower housing 420. The channels 490, 500 and 510 described are exemplary and accordingly will be discussed in detail. The number, size and arrangement of the dry channels is a matter of design choice.

Heat transfer rods are arranged in a grid-like configuration and extend through the dry channels and through the adjacent auxiliary water and air cooled portions of the lower housing 420. The heat transfer rods or grids are generally arrayed in two groups, as shown in FIG. 3. They include upper grids which consist of perpendicularly arranged rods 520 and 522, and lower grids which consist of perpendicularly arranged rods 530 and 532. The upper grids, comprising rods 520 and 522, are vertically spaced apart and extend generally between the walls and through the dry channels and the adjacent wet chambers. The lower grid, comprising rods 530 and 532, are substantially identical in configuration to the upper grids. The upper grids are disposed between the plates 480, 482 and the lower grids are disposed in the lower portion of the housing 420 generally below the plate 482 and above the layer of evaporative media 540. Chamber 542 is defined between the evaporative media layer 540 and the bottom plate 462 of the lower housing 420.

A layer of evaporative media 544 extends around the lower portions of the dry channels and the lower group or grids of rods 530, 532. The evaporative media layer 544 is upwardly spaced apart from the evaporative media layer 540.

Within the air intake 412 of the cooler housing 410 is air intake fan having fan motor 600 and blades 602. The fan forces air downwardly through the various sections of the housing 410, as shown by the large arrows in FIG. 3. That is, air flows inwardly through the air intake portion 412 and into the lower housing section 420, downwardly through the dry channels 490, 500, 510 and through the evaporative medium 540 and into lower chamber 542.

From chamber 542, a portion of the air flows around the restrictor plate 468 and outwardly through the register 464 or alternate register 464A and is directed to a space to be cooled as supply air. A second portion of the air flow in the chamber 542 reverses and flows upwardly through the evaporative layer 540 and through the evaporative media 544 into the open intermediate chamber 486. This secondary air flow is discharged outwardly through apertures 422, 432, 436 and 442 under control of dampers 424, 434, 436 and 444. The water cooling chambers 501, 503, 505 and 507 are located in the upper part of housing 420 between the upper plate 480 and the middle plate 482 and are closed and do not contain evaporative media. Cooling in these chambers is achieved from the cooled water in the pan 370 of the cooling tower 310 which cooled water is directed through water lines 380 and 390 which are connected to a series of water distribution manifolds which supply nozzles 394, 396 which spray water over the portion of the upper rod grids located in the water cooling chambers. The water then falls onto the top of plate 482 and drains through drain line 400 where it is returned to the reservoir 350.

A second reservoir and water system supplies water to evaporative media 540 and 544 in the lower section of the housing. Water from the reservoir 550 is pumped by a pump 556 through a line 554. Water supply line 554 connects a plurality of water distribution manifolds and nozzle assemblies 560, 562, 564 and 566 which are substantially the same as the water supply manifold assemblies discussed above. Excess water from the media 540 and 544 collects in the sump in the bottom of the housing 418 and drains back to the reservoir 550 via line 570 and valve 572.

Air flowing downwardly through the housing 420 under the influence of the fan is directed through the dry air channels and past the upper and lower rod grids. The sections of the heat transfer grids located within the upper cooling chambers are directly cooled by the cooled water from the cooling towers pan 370. The rods 520, 522 extract heat from and cool the air flowing through the adjacent dry channels, such as the channels 490, 500 and 510. The water supplied from the pan 370, which has been warmed as heat transfer occurs, is collected on plate 482 and drains through the return line 400 to the reservoir 350 for re-use.

The second water supply system supplies water to the wet channels in the lower part of the housing which contain evaporative media 544 and 540. Upper plate 480 closes off the upper cooling chambers and allows air to flow only downwardly through the dry channels. The lower heat transfer rod grids 530, 532 operate in a manner similar to the upper grids 520, 522 with the difference being that the lower grids are cooled in the wet chamber by means of the countercurrent secondary air stream which is evaporatively cooled by wetted media 540, 544.

Accordingly, there are multiple stages of cooling in the apparatus 310. The first or initial stage of cooling accomplished by cooling tower water from the pan 370 which is then sprayed onto the upper heat transfer rods 520, 522. Another stage occurs as heat is transferred from the air flowing in the dry channels over the rods 520, 522. A further air cooling stage of the air stream in the dry channels is provided by heat transferred by the rods 530, 532, which are cooled in the wet channels by the evaporated water supplied from the reservoir 550 to the evaporative cooling media 544. Heat is transferred from the air flow in the dry channels to the rods 530, 532 in the dry channels and to the wet evaporative media 544 in the area around the dry channels.

The third stage of air cooling is adiabatic cooling which takes place as the air from the dry channels flows through tile lower wet evaporative media 540 into the chamber 542.

Evaporative cooling apparatus 700 shown in FIGS. 5 to 13, is an alternate embodiment of the apparatus and also includes dry channels and wet channels and intersecting heat transfer elements. Referring to these figures: Cooling apparatus 700 includes an air intake 702 which is shown as a relatively short cylindrical section. Projecting outwardly from the air intake 702 is sloping front wall 708 which extends to the main housing 710 as a transition from the circular air intake 702 to the generally rectangular housing 710. Housing 710 includes a pair of spaced apart side walls 712 and 714, bottom wall 716, rear wall 718 and top wall 722. A supply connection 720 for delivery of cooled supply air is secured to the rear wall 718.

Figure 5:
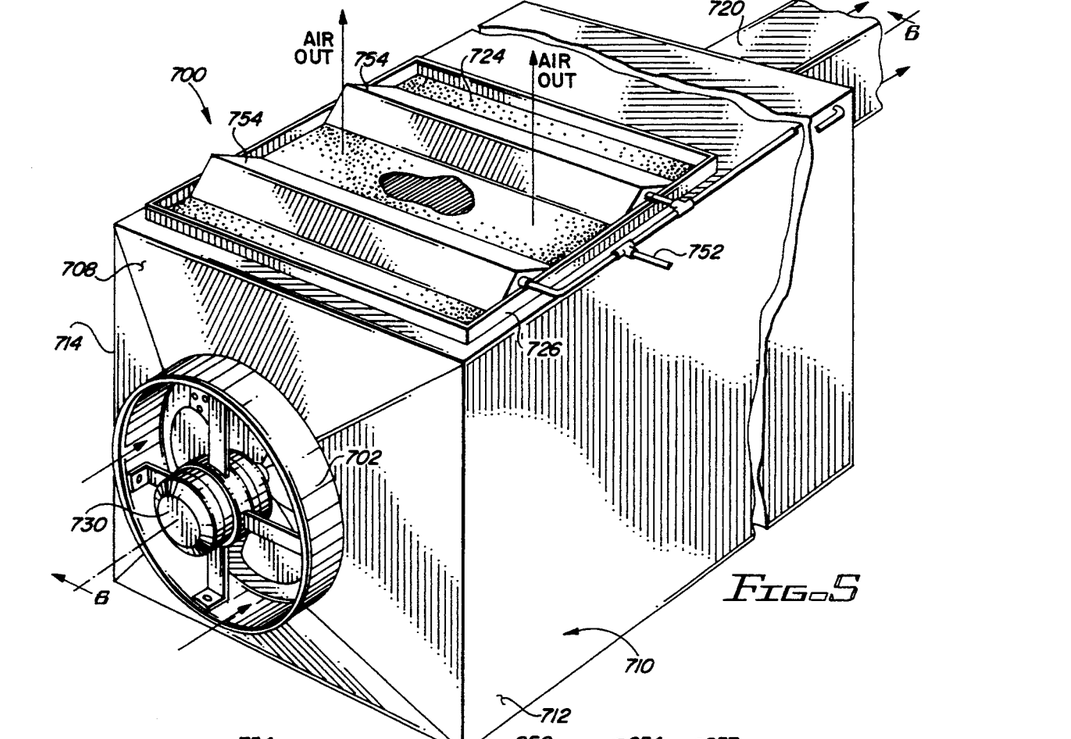
FIG. 5 is a perspective view of another alternate embodiment of the apparatus of the present invention.
Figure 6:
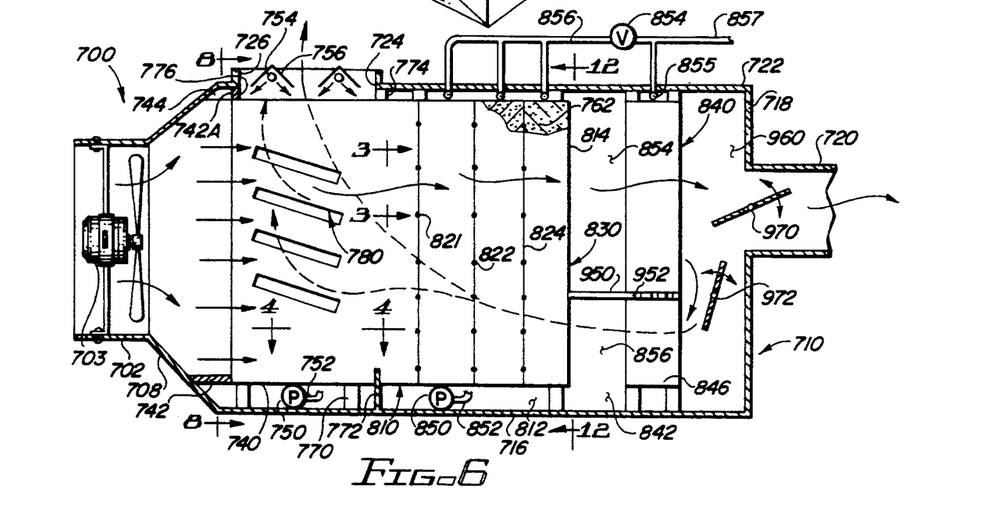
FIG. 6 is a view in partial section taken generally along line 6—6 of FIG. 5 and schematically illustrating the air flows in the apparatus of FIG. 5.
Figure 7:
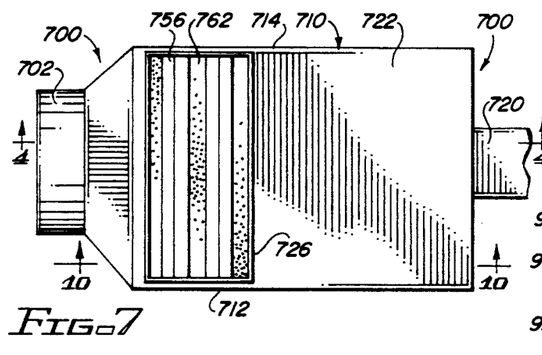
FIG. 7 is a top view of the apparatus of FIGS. 5 and 6.

The top wall 722 defines an opening 724 positioned generally adjacent front wall 708. The opening 724 extends nearly the full width of the housing 710 and has an upwardly extending rim 726. Disposed below the opening 724 within the housing 710 adjacent the air intake 702 is first stage cooling assembly 740 supported above the floor. The first stage cooling assembly 740 defines a plurality of adjacent and alternating wet and dry channels as will be explained.

Included in the first stage cooling section 740 is a first stage water supply system which includes pump 750 and water supply line 752 extending upwardly from the pump 750 to water supply manifold 754 which is disposed within opening 724 beneath shields 756. Water from manifold 754 flows downwardly through the evaporative media in the wet channels to a sump 770 in the bottom of the housing 710. Pump 750 receives its water supply from the sump 770, and also from a makeup water supply, not shown.

Sump 770 is defined by the bottom of the housing 716, the front of the housing 710 and transversely extending plate or baffle 772 which extends between the side walls 712 and 714 and upwardly from the floor 716. Plates 742 and 742A direct the total flow into the dry channels of the heat exchanger preventing air leakage out the exhaust or through the sump.

The evaporative media in the first cooling stage and also in the second cooling stage is preferably a hygroscopic, porous polyvinyl chloride material, preferably dimpled to help saturate the material. The interior of the dry channels are coated with a waterproof material, such as a film of polyvinyl chloride, to prevent moisture from entering into the dry channels from the wet channels.

Figure 13:
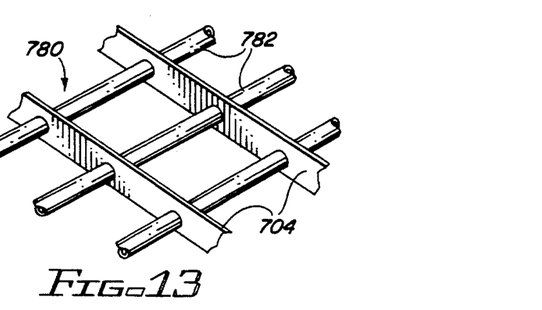
FIG. 13 is a perspective view of a portion of the apparatus of FIG. 6.

Intersecting the first stage cooling section 740 and the wet channel material and the dry channel material, are heat exchange elements 780. The heat exchange elements 780 are best shown in FIG. 13 and comprise a plurality of solid rods 782 aligned generally parallel to one another and held in place by support elements 704. The heat exchange rods 782 are generally horizontal, extending generally between the sides 712 and 714 of the housing, disposed at a rearwardly, downward angular orientation as seen in FIG. 6.

Elements 780 intersect both the dry and wet air channels and, accordingly, due to higher air pressures existing in the dry channels there will be some slight transfer of air from the dry channels into the wet channels where the elements penetrate the walls. However, this leakage is relatively insignificant with respect to the total air flow and overall efficiency of the apparatus.

Adjacent the first stage cooling section 740 is second stage cooling sections 810. The second stage cooling section 810 is substantially a continuation of the first stage cooling section 740. However, the second stage cooling section 810 includes a plurality of heat exchange grids 820, 822 and 824 extending vertically and transversely within the cooling stage 810. The second stage is supported above the floor on pads and a sump 812 is defined at the bottom of the housing 710 beneath the second stage cooling section 810 rearwardly of the plate 772.

The heat exchange grids 820, 822, and 824 are similar in construction. Each comprises a plurality of solid rods 821 located normal to the air flow and arranged generally parallel to one another and secured together by perpendicular rods, as by welding. In structure, the grids 820, 822 and 824 are substantially identical to the heat exchange grids discussed above and illustrated in conjunction with the embodiments of the cooling apparatus 10 and cooling apparatus 310. In a manner similar to heat exchange elements or grids 780, heat exchange grids 820, 822, and 824 intersect both the wet and dry channels, and accordingly some intermixing of the air flow through the dry channels.

The apparatus 700 includes a third stage cooling section 840 which is spaced from the second stage cooling section 810 resting on supports. The water supply system for the second and third stages includes a pump 850 in common sump 812. Connected to pump 850 is a water supply line 852 which extends to an appropriate water distribution manifold 855 disposed at the top of the third stage cooling section 840. This is schematically illustrated in FIG. 6.

A valve 854, preferably a solenoid controlled valve, is interposed between line 852 and line 856. Line 856 extends to water distribution manifolds 857 which supply water to the second stage cooling section 810. A pad, such as pad 762, is disposed across the top of the second and third cooling stages to distribute the water flow from the manifolds onto the evaporative cooling media.

As indicated above, both the first stage cooling section 740 and the second stage cooling section 810 are substantially identical in general construction. Each includes a plurality of alternating wet and dry channels through which air flows.

Figure 8:
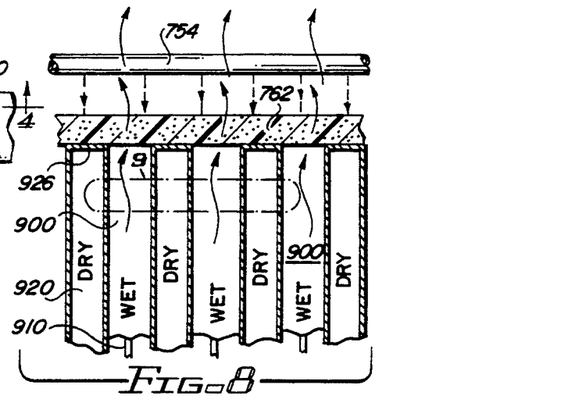
FIG. 8 is a schematic representation of a portion of the apparatus of FIG. 6 in partial section and taken generally along line 8—8 of FIG. 6.

The wet and dry channels of the first and second cooling stages are schematically illustrated in FIG. 8. FIG. 8 also illustrates the water supply manifold 754 which distributes water onto the pad 762. From the pad 762, the water flows onto the evaporative media of the wet channels, which is illustrated in greater detail in FIG. 9.

Figure 9:
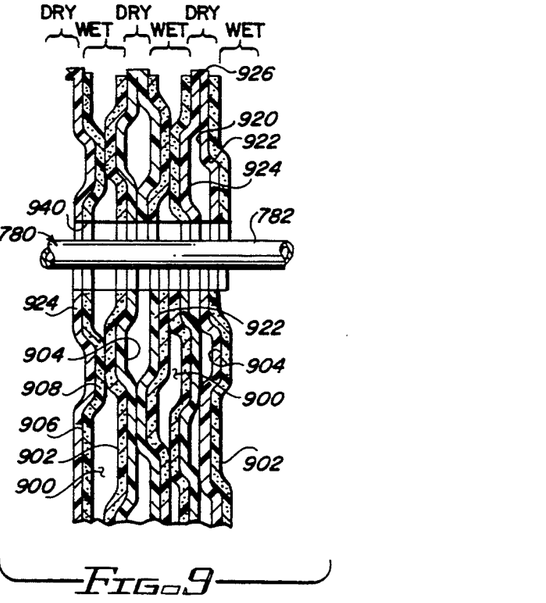
FIG. 9 is an enlarged view in partial section taken generally from Oval 9 of FIG. 8.

As seen in FIG. 8, secondary air flows upwardly through the wet channels and outwardly from the housing 712. FIG. 8 discloses a plurality of alternating wet channels 900 and dry channels 920. Details of the wet and dry channels are best shown in FIG. 9. The wet channels 900 comprise layers 902 and 906 of hygroscopic porous PVC material. The layers 902 and 906 include appropriately spaced dimples or projections 904 and 908, respectively, which space the layers 902 and 906 apart and induces turbulence to increase the heat transfer value between the air flows in the dry and wet channels.

The dry channels 920 include layers 922 and 924 of moisture impervious material, such as polyvinyl chloride, appropriately bonded to the layers 902 and 906 of the hygroscopic porous material. That is, the dry channels are defined by the "opposite" sides of the wet channel material to which the moisture impervious layers have been bonded. Thus, the wet channels and dry channels are adjacent to each other, with the interior sides of the dry channels defined by the opposed moisture impervious surfaces. The wet channels are defined by the adjacent surfaces of moisture pervious, or hygroscopic porous material. In both the wet channels and dry channels, the dimples or projections provide spacing for the air flow.

A heat exchange element 780 is shown in FIG. 9 extending through heat transfer channel 940 which extends transversely through both the wet channels 900 and the dry channels 920, as discussed above. In FIG. 9, a single rod element 782 is shown.

FIG. 8 is taken generally along line 8—8 of FIG. 6 at the front end 744 of the first stage cooling section 740. As shown in FIG. 8, the wet channels 900 are closed by seals 910 so that air flow does not enter the wet channels from the front of the first cooling stage. The dry channels 920 are open so that the total air flow from the fan and air intake section 702 is directed through the dry channels 920 of the first cooling section 710.

Also, as shown in FIG. 8, the dry channels include top seals 926 and similar bottom seals, not shown, that prevent the air flow through the dry channels from escaping upwardly and downwardly through the dry channels 920. On the other hand, the wet channels 900 located within opening 724 are open on both the top and bottom sides so that air flowing through these channels flows upwardly and outwardly through the opening 724. Seals 774 and 776 are disposed on the top of the first cooling stage 740 adjacent opening 724 to seal the opening 724 to control the air flow out of the opening 724.

In FIG. 6, the third stage cooling 840 is shown divided into two portions, an upper portion 844 and a lower portion 846, by a generally horizontally extending plate 950. The plate 950, as best shown in FIG. 12, extends between the side walls 712 and 714 of the cooling housing 710.

The plate 950 defines a plurality of holes or perforations 952 only in the portion of the plate positioned in the evaporative media in the third cooling stage 840. The perforations 952 allow water to flow downwardly through the entire depth of evaporative media.

Plate 950 divides the space downstream of the end 814 of the second cooling stage 810 into two chambers. There is a top, total air flow chamber 854 above the plate 950 and a lower, wet air flow chamber 856 below the plate 950.

Figure 12:
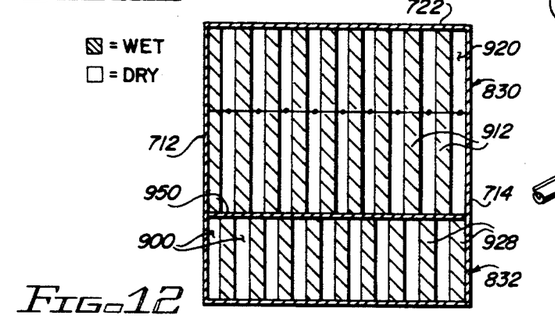
FIG. 12 is a schematic representation of a cross sectional portion of the apparatus of FIG. 6 taken generally along line 12—12 of FIG. 6.

As seen in FIG. 12, the dry channels 920 located above plate 950 are open and the wet channels 900 are closed by end seals 912. Below the plate 950 the wet channels 900 are open and the dry channels are closed by end seals 928.

Figure 10:
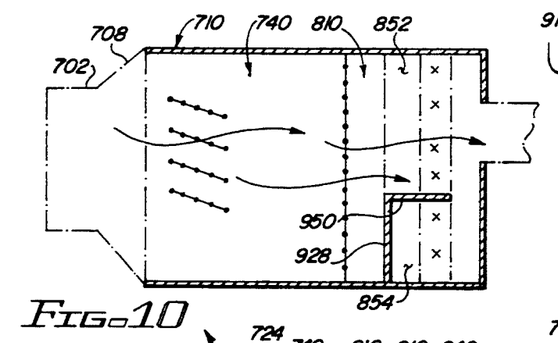
FIG. 10 is a schematic representation of one air flow in the apparatus of FIG. 5.
Figure 11:
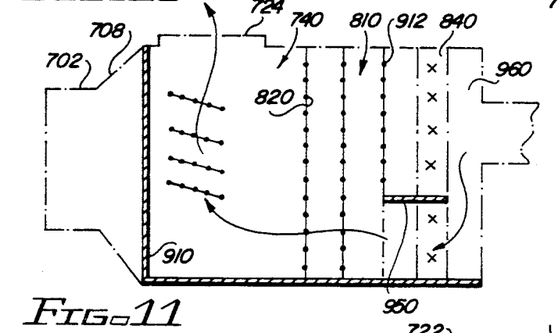
FIG. 11 is a schematic representation of another air flow in the apparatus of FIG. 5.

Referring now primarily to FIGS. 6, 10 and 11, the air flow through the cooling housing 710 is illustrated. Intake air entering through the air intake section 702 flows into the dry channels 920. The total air flow passes across the heat exchange elements 780 which extend transversely through both the wet channels 900 and the dry channels 920. The total air continues to flow through the first cooling stage section 740 and through the second stage cooling section 810. In the second stage cooling section 810, air also flows through heat exchange elements 820, 822, 824.

The air flowing through the dry channels 920 is then directed outwardly through the upper portion 830 of the second stage cooling section 810 at the end 814 and the space between the second stage cooling section 810 and the third stage cooling section 840 above the plate 950. Generally, the air flowing through the dry air channels 920 is cooled by heat exchange occurring with the adjacent wet channels and the heat exchange rod units or grids, including units 780 in the first cooling stage 740 and units 820, 822, and 824 in the second cooling stage 810. The total flow of air is also evaporatively cooled as it flows through the upper portion 844 of the third stage cooling section 840. From the third stage cooling section 840, the air flows into chamber 960 which is defined between the third stage cooling section 840 and the end wall 718 of the housing 710.

A damper 970 is disposed at the juncture of the chamber 960 and the duct 720. The damper 970 controls the flow of air from the chamber 960 into the supply air connection 720 which flow is the supply air.

A second damper 972 is located in the lower portion of chamber 960, at the level of the plate 950. Damper 972 is used in conjunction with the damper 970 to control the flow of air from the chamber 960. Damper 972 primarily controls the flow of air from the upper portion of the chamber 960 into the lower portion 846 of the third stage cooling section 840. The air flowing downwardly past the damper 972 and into the lower portion 846 of the third stage cooling section 840 flows into the chamber 956 below the plate 950 and into the wet channels 900 and this flow is designated as the secondary air flow.

FIG. 11 is a schematic representation of the air flow through the wet channels 900. The air flows into the wet channels 900 from the lower portion of the chamber 960 through the bottom portion 846 of the third cooling stage 840 below the plate 950. The air in the wet channels 900 then flows generally forwardly and upwardly, past the heat exchange elements or grids 820, 822, 824 in the second stage cooling section 810, and across the heat transfer elements 780 in the first stage cooling section 740. The air in the wet channels 900 then exits as exhaust air through the opening 724 in the top wall of the housing.

In FIG. 10, the end seal 928 of the dry channels is schematically illustrated as a barrier to the flow of the air into the dry channels. The front end seal 910 and the rear end seals 912 are similarly schematically illustrated as barriers to the flow of air in the wet channels. The end seals 928 below the plate 950 represent a barrier to the flow of air into or out of the dry channels. The air flowing in the wet channels 900 is in a general direction counter flowing to the air flow in the dry channels.

All of the dry channels are sealed at the top and at the bottom within the first cooling stage 740 and in the second cooling stage 810. The bottoms of the wet channels in both the first and second cooling stages are open along their entire length from the front end to the rear end. The corresponding length of the dry channels are sealed.

In both FIGS. 10 and 11, only one of the vertically and transversely oriented heat exchange grids 820 is shown. The grid 820 accordingly schematically represents the three heat exchange grids 820, 822, 824 as shown in FIG. 6.

The evaporative media in the third cooling stage 840 may be any appropriate material. All of the air flowing in the third cooling stage 840 is subject to evaporative cooling. The air flows are balanced by the damper position, as desired, to produce the appropriate or desired cooling under various circumstances.

In addition to controlling the air flows, water directed to the third stage cooling evaporative media and also the second stage evaporative media is controlled by the valve 854. Water control, along with air control, determines the cooling that takes place.

Depending on outdoor air conditions, different modes of operation of the apparatus 700 may be employed. The size of the apparatus and the amount of space to be cooled is also a design consideration, as is well known and understood in the art.

Maximum cooling is accomplished when the air entering the dry channels in the first stage cooling 740 flows through the first and second cooling stages and through the third cooling stage, with water introduced in all three stages. The total air flow in the apparatus 10 is divided in the chamber 960 into the two flows, a "supply" air stream which flows outwardly past the damper 970 and into the discharge air connection 720, and a secondary air flow which flows downwardly across damper 972 and back through the lower portion 846 of the third cooling stage 840 and into the wet channels in the second stage and the first stage cooling sections 810 and 740, respectively.

In order for water to be directed to the evaporative media in the second stage 810, the solenoid valve 854 in line 856 is opened. This maximum cooling mode is most efficient when the relative humidity is relatively low and when the ambient air temperature is relatively high.

In a second mode of operation, the water pumps 750 and 850 are used to supply water to only the first stage cooling section 740 and the third stage cooling section 840. In this mode, the solenoid valve 854 is closed to prevent water from flowing to the second stage cooling section 810. This second mode of operation is best suited for moderate cooling.

In a third mode of operation, pump 850 is utilized to supply water to only the third cooling stage 840. Pump 750 is off, and accordingly no water is supplied to the first cooling stage 740. Valve 854 is closed, so that no water is provided to the second cooling stage 810. In this mode of operation only moderate cooling is accomplished.

Figure 14:
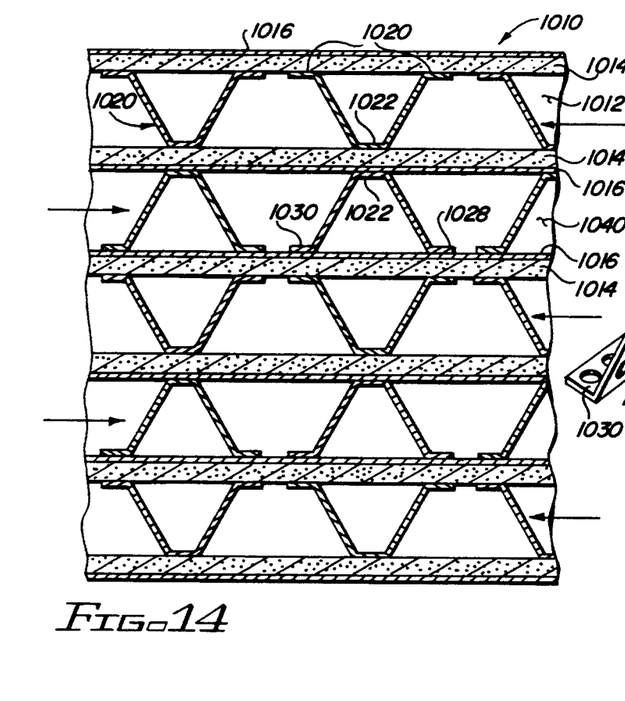
FIG. 14 is a partial sectional view of another embodiment.
Figure 15:
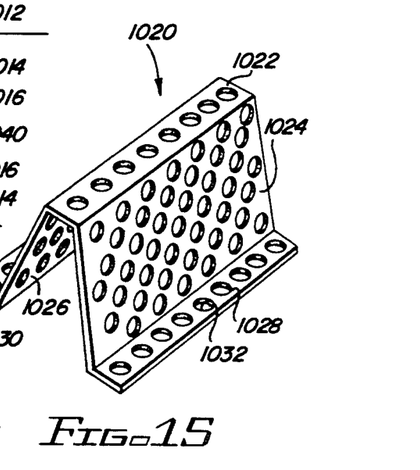
FIG. 15 is a perspective view of a spacer.

FIG. 14 is a view in partial section of a portion of the apparatus of the present invention. FIG. 14 comprises a view in partial section of an alternate embodiment of the wet and dry channels such as 900 and 920, respectively, of the apparatus 700 of FIGS. 5–13. In FIG. 14, a plurality of alternating wet and dry channels 1012 and 1040 are shown. FIG. 15 is a perspective view of a spacer 1020 which is used to space apart the evaporative media which comprises the wet and dry channels 1012 and 1040, respectively.

Wet and dry chambers of apparatus 1010 shown in FIG. 14 comprise a plurality of alternating wet channels 1012 and dry channels 1040 spaced apart by a plurality of spacers 1020. The wet channels 1012 each comprise spaced-apart evaporative media layers 1014, with a plurality of the spacers 1020 between them. The dry channels 1040 each comprise alternating layers of the evaporative media 1014 with a moisture impervious layer 1016 on the "outer" side of a layer of evaporative media 1014. A plurality of spacers 1020 separate the moisture impervious layers within the dry channels.

Each spacer 1020 comprises a base portion 1022 with a pair of webs 1024 and 1026 extending outwardly from the base 1022 at diverging angles. Extending outwardly from the web 1024 is a flange 1028. Extending outwardly from the web 1026 is a flange 1030. The flanges 1028 and 1030 are generally aligned with each other in the same plane and they are generally parallel to the base 1022.

The elements of the spacer 1020 are all provided with a plurality of apertures 1032 which allow air to plow through the spacer. The shape of the spacers may vary and be, for example, "Z" shaped. Various materials, such as wire mesh or perforated sheet metal could be used. The dimension, shape, location and number of apertures 1032 are selected so that the air flow passing through them maximizes the evaporative effects on the air flow through the channels to achieve greater cooling efficiency.

The spacers 1020 are positioned in the wet and dry channels so that base elements 1022 will be adjacent to each other and the flanges will be adjacent to each other. The term "adjacent" refers to the orientation of the base elements or feet or flange elements on opposite sides of the evaporative media layers.

The use of the relatively flat sheets or layers of evaporative media 1014 1016 in the wet and dry channel apparatus 1010 is in contrast to the dimpled media for the wet and dry channels of the apparatus 700. The spacers 1020 provide essentially the same functions, but they comprise a separate element rather than an integral element, as with the construction of the wet and dry channels 900 and 920.

It will also be noted that the spacers in the wet and dry channels 1012 and 1040 also provide additional area or surface area for heat transfer purposes, as well as providing the functions of the spacing and the turbulent air flows. The spacer elements 1020, preferably made of metal, provide essentially the same functions providing additional heat transfer area, spacing and inducing turbulent air flow.

Figure 16:
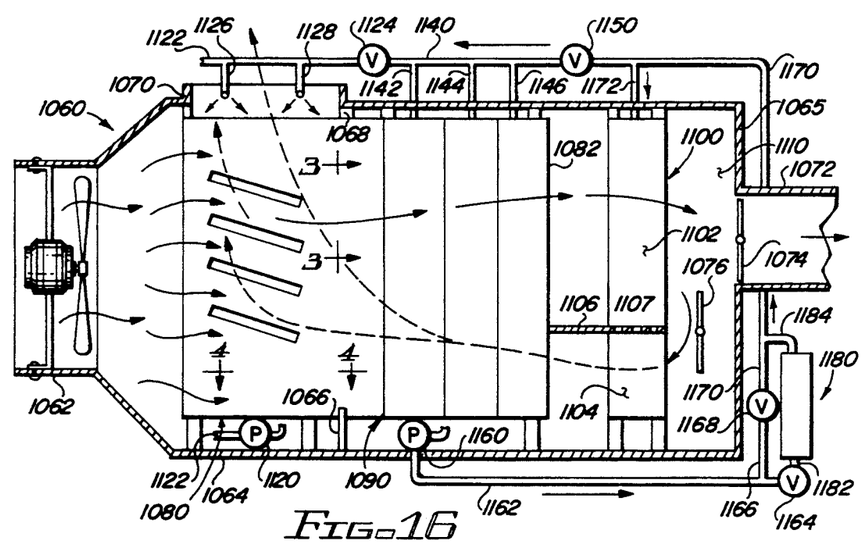
FIG. 16 is a side view partly in section of an alternate embodiment of the apparatus designated by the numeral 700.

FIG. 16 is a side view in partial section of an alternate embodiment of apparatus 700. In FIG. 16, the basic structure of the apparatus 700 is utilized but is used to cool either air or water. The cooled water may, in turn, be used for cooling purposes, rather than directly using air flow for cooling purposes. With the device of FIG. 16, 100% air recirculation occurs.

Cooling apparatus 1060 of FIG. 16 includes an air intake section 1062 which extends to a cooler housing 1064. The cooler housing 1064 is, in general, substantially identical to the cooler housing 710 illustrated in detail above. The primary difference between apparatus 1060 and apparatus 700 is in the water circulating system.

The apparatus 1060 includes three cooling stage sections, a first stage cooling section 1080, a second stage cooling section 1090, and a third stage cooling section 1100. The first and second cooling stages 1080 and 1090 are adjacent one another, while the third stage cooling section 1100 is spaced apart from the end of the second stage cooling section 1090.

Supply air connection 1072 extends outwardly from and at the rear of the housing 1064. A damper 1074 is disposed at the juncture of the connection 1072 and the housing 1064. The damper 1074 is shown in its closed position, preventing air flow from exiting the housing 1064 outwardly through the supply connection. Accordingly, all of the air flow from the air intake 1062 is directed through the dry channels and then through the wet channels to eventually be discharged through exhaust 1070.

The third cooling stage section 1100 includes an upper portion 1102 and a lower portion 1104. A plate 1106 divides the upper portion 1102 and a lower portion 1104. The plate 1106 is perforated at 1107 within the third cooling stage 1100. From the third cooling stage 1100, plate 1106 extends to a rear face 1092 of the second cooling stage 1090. As with the apparatus 700, all of the dry air channels above the plate 1106 are open and all of the wet channels are closed. Below the plate 1106, all of the dry channels are closed and the wet channels are all open.

A chamber 1110 is defined within the housing 1064 between the third cooling stage 1100 and a rear wall 1065 of the housing 1064. Damper 1076 is disposed in the chamber 1110 at about the level of the plate 1106. The damper 1076 is shown open in FIG. 16 so that all of the air flow through the dry channels and through the third cooling stage 1100 is directed downwardly in chamber 1110 from the upper portion 1102 of the third cooling stage 1100 and through the lower or bottom portion 1104 of the third cooling stage 1100 and into the wet air channels in the second and first cooling stages 1090 and 1080, respectively.

Pump 1120 is located within the sump at the bottom of the housing 1064 beneath the first cooling stage 1080.

The pump 1120 circulates water or pump water from the bottom sump, including any makeup water, as required, to a conduit 1122. The conduit 1122 extends to a valve 1124. Branch conduits 1126 and 1128 are illustrated as extending from the conduit 1122 to manifolds which distribute water over the first cooling stage 1080.

A conduit 1140 extends from the valve 1124 to a valve 1150. Three branch conduits 1142, 1144, 1146 are shown extending from the conduit 1140 to provide water for the second cooling stage 1090 although any suitable number may be used.

A second pump 1160 is shown disposed in a sump at the bottom of the housing 1060 beneath the second and third cooling stages 1090 and 1100, respectively. The pump 1160 circulates water from the second and third cooling stage sump, and any makeup water as required, to a conduit 1162. The conduit 1162 extends to a valve 1164. A branch conduit 1166 extends from the conduit 1160 to the valve 1168. A conduit 1170 extends to the valve 1150. A branch conduit 1172 is shown extending from the conduit 1170 to a manifold which provides water for the third cooling stage section 1100.

From the valve 1164, a conduit 1182 extends to a heat exchanger 1180. The heat exchanger 1180 comprises an end use element for the cool water pumped by the pump 1160 through the conduit 1162, the valve 1164, and the branch conduit 1182. A second branch conduit 1184 extends from the heat exchanger 1180 to the conduit 1170 above the valve 1168.

In its water cooling mode, the apparatus 1060 will operate generally as discussed above, with all of the air flow from the dry channels being directed to the wet channels. This operational mode will provide maximum cooling for the water flowing in the second and third stages, and accordingly the water pumped by the pump 1160 will be cooler or lower than the wet bulb temperature of the air entering into the air intake 1062.

In the water supply system, the pump 1120 will supply water to the conduit 1122 and the conduit 1140. Valve 1124 will be open to allow the water from the pump 1122 to provide the water for both the first and second stage cooling sections. The valve 1150 will be closed, and the valve 1168 between the conduits 1166 and 1170 will also be closed.

The valve 1164 between the conduits 1162 and 1182 will be open. Accordingly, the cold water flowing form the second and third cooling stages will be pumped by the pump 1160 through the conduit 1162 to the valve 1164 and the conduit 1182 to heat exchanger 1180. From the heat exchanger 1180, the water will flow through the conduit 1184 to the conduit 1170 and to the branch conduit 1172 where the water will flow into the third cooling stage section 1100.

It is obvious that the heat exchanger 1180 may be placed at any convenient location as required. The illustration in FIG. 16 is, of course, schematic only with respect to the location, size, etc.

Figure 17:
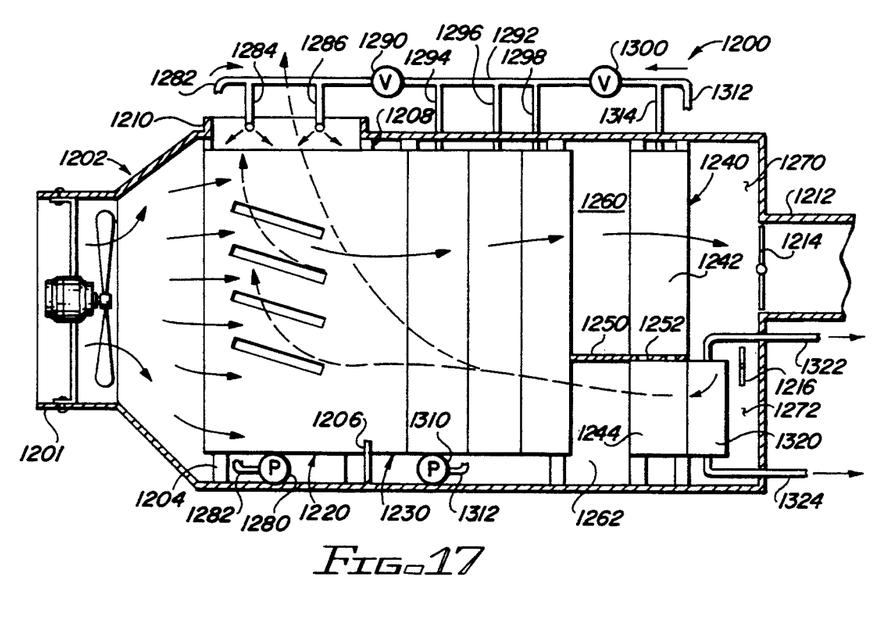
FIG. 17 represents still another embodiment.

FIG. 17 shows still another embodiment of the apparatus of the present invention which comprises an alternate embodiment of the apparatus 1060 of FIG. 16. Cooler apparatus 1200 of FIG. 17 like cooler apparatus 1060 of FIG. 16, is designed to cool a flow of fluid such as water, rather than a flow of air to be used or circulated throughout the building. However, the apparatus of FIG. 17 can also be used to cool air, if desired.

Apparatus 1200 is designed to cool a flow of water in which the water to be cooled is in a closed circulation loop generally "external" to the water supply system of the apparatus 1200. In the apparatus 1060, the cooled water is part of the cooling water supply system and is not part of the internal recirculating water system of the apparatus 1200.

The cooler apparatus 1200 includes an air intake portion 1201 which extends at housing section 1202 to cooling housing 1204. Within the cooling housing 1204 are three cooling stages including a first cooling stage 1220, a second cooling stage 1230, and a third cooling stage 1240. The first and second cooling stages 1220 and 1230 are disposed adjacent to each other, and the third cooling stage 1240 is spaced apart slightly from the second cooling stage 1230. Above the first cooling stage section 1220 is an air exhaust opening 1210. Air flows out of the housing 1204 through exhaust opening 1210 in generally the same manner as discussed above with reference to the embodiment 1060. That is, the air flow through the wet channels of the cooling stages 1220 and 1230 is countercurrent to the flow in the dry channels and is directed outwardly through the exhaust opening 1210.

A cooled air connection 1212 extends from the back of the housing 1204 to provide a supply of cool air from the apparatus 1200. A damper 1214 controls the flow of air through the connection 1212. In the embodiment of apparatus 1200, the damper 1214 is closed, thus preventing a flow of cooled air outwardly through the connection 1212.

The first cooling section 1220 is generally separated from the second cooling stage section 1230 by a bottom plate 1206 and a top seal 1208. That is, the bottom plate 1206 serves to divide the housing 1204 into two portions, the first stage portion and a second and third stage portion. The top seal 1208 serves to isolate the flow of air so that the flow of air through the wet channels is directed outwardly through the exhaust opening 1210. Again, this is substantially identical to the apparatus 1260 and also to the apparatus 700.

To separate the flows of air in the wet channels and in the dry channels of the first and second stages, and also to separate flows of air through the third cooling stage 1240, plate 1250 is provided which extends from the second cooling stage 1230 through the third cooling stage 1240. The plate 1250 includes a perforated portion 1252 within the third cooling stage 1240. The plate 1250 and its perforated portion 1252 divide the second and third cooling stages into an upper portion 1242 and a lower portion 1244. The plate 1250 also divides the space between the second and third cooling stage into an upper portion 1260 and lower portion 1262. The space between the third stage 1240 and the end of the housing is also divided into two portions.

A chamber 1270 is defined between to the upper portion 1242 of the third cooling stage 1240 and the rear wall of the housing 1204. Adjacent the bottom or lower portion 1244 of the third cooling stage 1240 is an air-to-water heat exchanger 1320. A damper 1216 separates the upper chamber 1270 from a lower chamber 1272. The damper 1216 is disposed adjacent to the top or upper portion of heat exchanger 1320, and accordingly, is positioned at about the level of the plate 1250 and its perforated portion 1252. When damper 1216 is open, air is directed from the upper portion 1242 of the third stage cooling section 1240 through the heat exchanger 1320.

A pump 1280 is disposed in the sump defined at the bottom or lower portion of the housing 1204 beneath the first cooling stage 1220. A conduit 1282 extends from the pump 1280 to a valve 1290. The branch conduits 1284 and 1286 extend from the conduit 1282 downwardly to provide a flow of water for the evaporative media in the first cooling stage 1220.

A conduit 1292 extends from the valve 1290 to a valve 1300. For purposes of representation, three branch conduits 1294, 1296, and 1298 are shown schematically extending downwardly from the conduit 1292 to provide a flow of water for the evaporative media in the second cooling stage section 1230.

Disposed in the sump portion of the housing 1204 beneath the second and third cooling stage sections 1230 and 1240 is another pump 1310. A conduit 1312 extends from the pump 1310 to the valve 1300. A branch conduit 1314 extends from the conduit 1312 to provide a flow of water to the evaporative media in the third cooling stage 1240.

In the operation of embodiment of the apparatus 1200, valve 1290 is open, and accordingly the pump 1280 provides a flow of water to both the first and second stage cooling sections. Valve 1300 is closed, and accordingly the pump 1310 provides a flow of water only to the third cooling stage section 1240.

The heat exchanger 1320 includes a conduit 1322 which provides the flow of cool water outwardly from the heat exchanger 1320. A return water conduit 1324 supplies water to be cooled to the heat exchanger 1320.

In operation, the air flow through the dry channels of the first and second stages 1220 and 1230 is substantially as discussed above, and is illustrated by arrows. The solid arrows illustrate the flow of air through the dry channels and the dashed arrows and lines show the flow of air through the wet channels.

As with the other apparatus, the incoming air flow through the air intake 1201 flows only through the dry channels of the first and second cooling stages. As with the other embodiments, all of the dry channels are open above the plate 1250 and all of the dry channels are closed below the plate 1250. Above plate 1250, all of the wet channels are closed and below the plate 1250 all of the wet channels are open. Accordingly, all of the incoming air through the dry channels of the first and second stages 1220 and 1230 flows into the chamber 1260 above the plate 1250. The dry air flow then flows through the evaporative media in the upper portion 1242 of the third cooling stage 1240 and into the upper chamber 1270.

With the damper 1214 closed, the air flow from the upper portion 1242 of the third cooling stage 1240 flows downwardly into the lower chamber 1272. When damper 1216 is open, all of the air flow from the chamber 1270 to chamber 1272 is directed through the air-to-water heat exchanger 1320. From the heat exchanger 1320 the air enters the lower portion 1244 of the third cooling section and then flows into chamber 1262. From chamber 1262, all of the air enters into the wet channels in both the second and first cooling stages 1230 and 1220, respectively, and is ultimately exhausted outwardly through the air out rimmed opening 1210 in the upper part of the initial cooling stage.

Since the water flowing through the heat exchanger apparatus 1320 is in closed system, separate from the water supply systems of the pumps 1280 and 1310, the cooled water discharged from heat exchanger 1320 through conduit 1322 may be used for purposes remote from the apparatus 1200. Again, as with the apparatus 1060, the temperature of the cooled water discharged from heal exchanger 1320 is lower than the wet bulb temperature of the air entering into the apparatus 1200 through the air intake 1202.

To operate the apparatus 1200 as an air cool system, the damper 1214 opened and the damper 1216 is adjusted, as desired. Valve 1290 will be closed and the valve 1300 will be opened. With the valve 1290 closed, the pump 1280 provides water only for the first cooling stage section 1220. With valve 1290 closed and valve 1300 open, pump 1310 provides water for both the second cooling stage 1230 and the third cooling stage 1240. This operation is substantially identical to the use of the apparatus 1060 as a cooling air unit, rather than a cooling water unit.

To opeate the apparatus 1060, as shown in FIG. 16, as an air cooling unit, valve 1124 is closed, valve 1150 is opened, valve 1168 is open, and valve 1164 is closed. With valve 1124 closed, pump 1120 provides water only to the evaporative media in the first cooling stage section 1280. With valve 1164 closed and valve 1168 open, no water will flow through the heat exchanger 1180. With valve 1150 open, the pump 1160 will then provide flow of water to the second and third stage cooling sections or to the evaporative media therein.

In the air-cooling mode, dampers 1074 and 1076 are adjusted as desired to balance the flow of cooled air outwardly through the duct 1072 and back through the wet channels of the second and first cooling stages 1090 and 1080, respectively.

Figure 18:
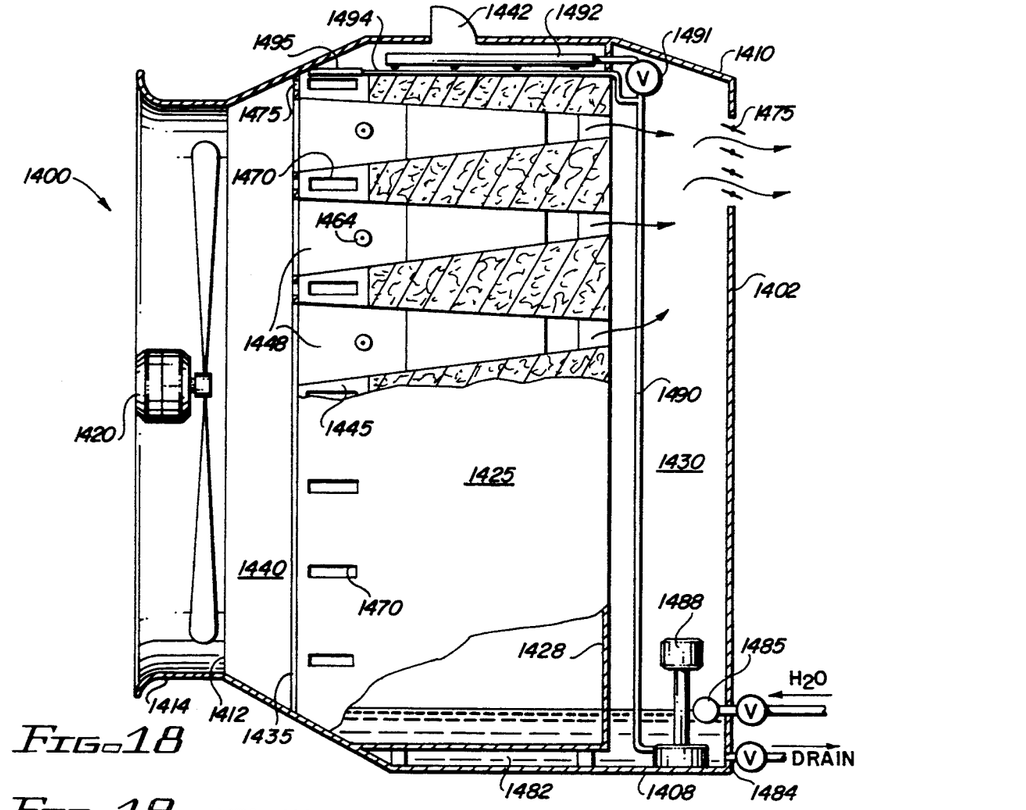
FIG. 18 shows still another embodiment.
Figure 19:
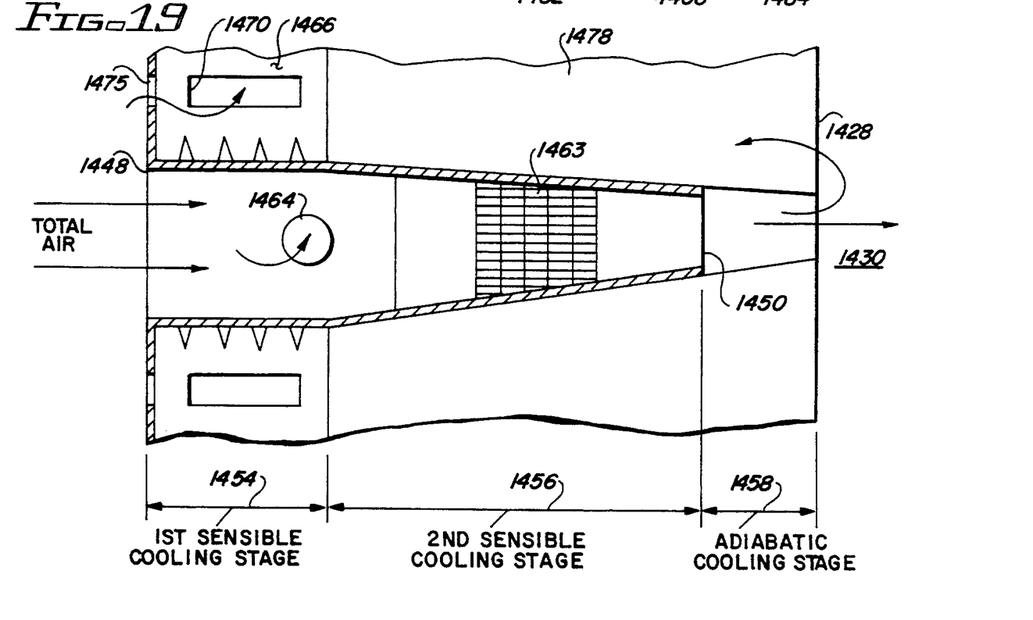
FIG. 19 is a detail view of a heat exchanger tube as indicated in FIG. 18.

FIGS. 18 and 19 show still another embodiment of the present invention which is generally designated by the numeral 1400. The primary advantages of the embodiment shown in these figures are reduced size, compactness and a high or increased heat transfer ratio. The apparatus 1400 includes a housing 1402 which may be any convenient shape but is shown as being generally cylindrical having an upstanding side wall 1404, bottom 1408 and top 1410. An opening 1412 is provided in the side wall to which is secured inlet 1414 which houses fan unit 1420. Within the housing is cooling core 1425 having a rear wall 1428 which extends transversely within the housing to define a plenum 1430 with the rear wall of the unit. Core 1425 also includes a front plate 1435 which extends transversely within the enclosure and defines an inlet plenum 1440 between the wall and the juncture of the inlet section of the housing. An exhaust outlet or opening 1442 is provided in the top wall of the housing. The core 1425 is a compact, three-stage multi-tube air cooling unit. Plate 1435 defines a plurality of openings 1448 arranged in a regular pattern which openings extend into the interior of the cooling core. Cooling tubes 1445 extends horizontally and rearwardly from each of the openings 1442. The tubes may be of various shapes but are shown as being slightly conical having an open inlet 1448 and a discharge end 1450. The tubes may be fabricated from various metal or plastic materials selected having good heat transfer characteristics. An initial portion of the length of the tubes define a first stage cooling, indicated by the numeral 1454, and a second sensible cooling stage, identified by numeral 1456. The zone extending from the discharge 1450 of the tube to the opening 1460 discharging into the rear plenum chamber comprises an adiabatic or third cooling stage 1458. Conductive heat exchange elements 1463 are arranged within the tubes in the second sensible cooling zone. The heat exchange elements 1463 preferably consist of transversely extending elements such as a screen or plurality of tubes of conductive material conductively bonded to the interior side walls of the tube. The heat exchange elements 1463 serve to increase the heat exchange effect and thus increase extraction of heat from air moving through the tubes.

The interior side wall of the tubes each define an intake opening 1464 located toward the inner end of the first sensible cooling stage 1454. These, openings communicate with vertically extending exhaust plenum 1466 which extends within housing 1402 and at its upper end communicates with exhaust opening 1442. Exhaust openings 1470 provide communication between the enclosure and the exhaust plenum 1466. In addition, a plurality of inlet openings 1475 are provided at locations intermediate the tubes in the front wall 1440 to allow a relatively small volume of air to flow into the exhaust plenum 1466 and via opening 1470.

The space within the second cooling stage 1456 and the third cooling stage 1458, contains a porous, hygroscopic media 1478 which may be any suitable absorbent material such as plastic, cellulose or aspen shavings, as known in the art.

The lower portion of the housing 1402 defines a sump 1482 having a drain valve 1484 and a float control valve 1485 for makeup water. Drain valve 1484 may be a solenoid operated valve and connected to a timer to periodically blow down the sump to remove sediment. Pump 1488 delivers water from the sump via conduit 1490 and valve 1491 to a horizontal distributor 1492 which sprays water on the upper surface of the evaporative media 1478 located within the enclosure. Valve 1494 is operable to control the delivery of water to the upper water distributor 1492. In addition, another conduit 1494 connects to water distribution collector 1495 arranged at the upper end of the vertically extending plenum 1466.

The cooling apparatus of FIGS. 18 and 19 operates in the cooling mode as follows:

Ambient air, such as outside air, is introduced into the intake of the unit 1414 under the influence of fan unit 1420. The intake air is directed under the influence of the fan to the intake plenum chamber. The total air flow exits the inlet plenum 1440 at two locations. Most of the air enters the cooling tubes 1445 through a plurality of inlets 1448 in the inlet grid. The remaining portion, which is termed the first auxiliary air flow stream, enters the exhaust plenum 1466 through openings 1475. The main air flow enters into the cooling tubes and is subject to sensible cooling in the first cooling stage 1454. Sensible cooling also occurs as the air flows through the second cooling stage 1456. A small portion of the air flowing through the first cooling stage is directed to the exhaust plenum 1466 by means of openings 1464 in the side walls of the tubes 1445. The air bled-off or exhausted at 1464 is termed the second auxiliary air flow and the remainder of air entering into the second sensible cooling stage is termed the primary air flow. The secondary auxiliary air flow enters into the exhaust plenum 1466 along with the first auxiliary air flow portion removed from the total air flow.

The primary air flow undergoes more extensive sensible cooling in the second sensible cooling stage 1456. The cooling effect in the second sensible cooling stage is enhanced by the heat exchange elements 1463 within this section which transfer heat from the primary air flow to the evaporative water. Indirect evaporative cooling occurs in the media 1478 around the cooling tubes. The evaporative cooling effect is well known and is due to the evaporation of the water in the media, the water being applied to the media by the distributor 1492 located at the upper end of the core 1425.

The sensibly cooled air exiting the inner end of the cooling tube is introduced into the adiabatic cooling zone 1458. The cooling tube, as shown, is slightly conical which will cause an increase in the air velocity as the air passes through the tube which serves to maintain a high heat transfer ratio. Adiabatic cooling occurs in cooling stage 1458 due to the contact of the primary air stream within the wetted media in this area. The primary air flow exits the second cooling stage and enters the adiabatic cooling zone and is directed into the discharge plenum 1430. A portion of the primary air, termed the third auxiliary air flow, is redirected into the evaporative media at the various openings 1428 located in the back side of the core 1425. The remainder of the cooled primary air is discharged from the plenum 1430 at damper controlled discharge opening 1475 and is termed the supply air and is directed to a point of use.

The third auxiliary air stream enters into the space filled with the wetted hygroscopic porous media and as the air moves through the media its temperature and humidity are increased. The third auxiliary air flow continues in a path countercurrently to the air flow through the cooling tubes and eventually will enter the exhaust air plenum 1466 through openings 1470 where it is mixed with the first auxiliary air flow and second auxiliary air flow, establishing a total auxiliary air flow which is contacted with water supplied by recirculating pump 1488 to distributor 1495 located at the upper end of the exhaust air plenum. The warmed and humidified total auxiliary air stream exits the cooling unit through exhaust openings 1442 at the upper end of the housing.

Thus, the present invention discloses a unique evaporative cooling arrangement which may take various forms and embodiments.

It will be obvious to those skilled in the art to make various changes, alterations and modifications to the method and apparatus described herein. To the extent such changes, alterations and modifications do not depart from the spirit and scope of the appended claims, they are intended to be encompassed therein.

I claim:

1. An air cooling apparatus comprising:
   (a) a housing defining an intake for a total air flow to be treated and an outlet for cooled supply air;
   (b) said housing defining at least one wet channel and one dry channel extending between said intake and outlet, said wet and dry channels arranged in adjacent heat exchange relationship and said dry channel having an inlet end communicating with said intake and a discharge end communicating with said outlet, said wet channel having opposite first and second inlet ends, said wet channel first inlet end communicating with said intake and said second inlet communicating with said outlet;
   (c) evaporative media disposed in said wet channel extending substantially the entire length thereof and water distribution means for delivering water to said evaporative media;
   (d) substantially solid conductive heat transfer elements extending in heat transfer relationship between the dry and wet channels arranged generally perpendicular to the flow through said channels;
   (e) an air discharge aperture located in said housing communicating with the wet channel at an intermediate location; and means for directing a part of the air flow discharged from said dry channel through said wet channel and a portion to said outlet whereby sensible cooling occurs in said dry channel with heat being transferred to said wet channel by conduction along said heat transfer elements and wherein said air flow in said wet channel from said first inlet end to said air discharge aperture is generally parallel to that in the dry channel and wherein said air flow in said wet channels from said second inlet and to said air discharge is countercurrent to the air flow in said dry channel.

2. The apparatus of claim 1 wherein said evaporative cooling media is a hygroscopic material.

3. The apparatus of claim 1 wherein said heat transfer elements comprise a plurality of rods of heat conductive material.

4. The apparatus of claim 3 wherein said rods are arranged in a grid-like structure.

5. The apparatus of claim 1 wherein said housing defines a sump therein positioned to receive water from said wet channels.

6. The apparatus of claim 1 wherein an evaporative media pad is positioned at the discharge of said wet and dry channel discharge ends.

7. The apparatus of claim 1 wherein said water distribution means comprises spray nozzles disposed adjacent said evaporative media.

8. The apparatus of claim 1 wherein said housing includes an air mover at said intake.

9. The apparatus of claim 1 wherein said air discharge aperture includes damper control means associated therewith.

10. The apparatus of claim 1 wherein said housing and wet and dry channels are vertically disposed.

11. The apparatus of claim 1 including a plurality of wet channels and a plurality of dry channels.

* * * * *